(12) United States Patent
Huang

(10) Patent No.: US 9,302,347 B2
(45) Date of Patent: Apr. 5, 2016

(54) LASER MACHINING DEVICE AND ADJUSTING METHOD FOR SAME

(71) Applicant: ScienBiziP Consulting (Shen Zhen) Co., Ltd., Shenzhen (CN)

(72) Inventor: Yung-Lun Huang, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 390 days.

(21) Appl. No.: 13/945,909

(22) Filed: Jul. 19, 2013

(65) Prior Publication Data

US 2014/0339208 A1 Nov. 20, 2014

(30) Foreign Application Priority Data

May 14, 2013 (TW) .............................. 102116950 U

(51) Int. Cl.
| | |
|---|---|
| *B23K 26/04* | (2014.01) |
| *B23K 26/042* | (2014.01) |
| *B41J 2/435* | (2006.01) |
| *B23K 26/08* | (2014.01) |
| *B23K 26/00* | (2014.01) |
| *H01S 3/13* | (2006.01) |

(52) U.S. Cl.
CPC ......... *B23K 26/0853* (2013.01); *B23K 26/0066* (2013.01); *B23K 26/04* (2013.01); *B23K 26/042* (2015.10); *B41J 2/435* (2013.01); *B23K 26/70* (2015.10); *H01S 3/13* (2013.01)

(58) Field of Classification Search
CPC ...... B23K 26/04; B23K 26/042; B23K 26/70; B41J 2/435; H01S 3/13

USPC ................ 347/224, 246; 219/121.62, 121.68, 219/121.69, 121.78; 356/318, 400, 559.3, 356/614

See application file for complete search history.

(56) References Cited

U.S. PATENT DOCUMENTS

| | | | | | |
|---|---|---|---|---|---|
| 5,004,348 | A | * | 4/1991 | Magome ............... | G03F 9/7049 250/548 |
| 6,774,340 | B1 | * | 8/2004 | Chiba ..................... | B41M 5/24 219/121.68 |

FOREIGN PATENT DOCUMENTS

| | | | |
|---|---|---|---|
| JP | 2001138079 A | * | 5/2001 |
| JP | 2007029989 A | * | 2/2007 |

* cited by examiner

*Primary Examiner* — Samuel M Heinrich
(74) *Attorney, Agent, or Firm* — Novak Druce Connolly Bove + Quigg LLP

(57) ABSTRACT

A laser machining device includes a laser emitting device, a supporting device including a supporting surface, a controller, and optical detecting units mounted on the supporting surface. The laser machining device sets an X-Y coordinates having an original point and moves to being substantially above one of the optical detecting units. A laser beam is emitted at a plurality of microscopically-close positions and the values of the luminous flux of the received laser beams are detected, the values being sent to the controller. The controller compares the detected values to determine the greatest value, and corrects the position of the original point to accord with the position of the greatest detected value.

12 Claims, 3 Drawing Sheets

LASER MACHINING DEVICE AND ADJUSTING METHOD FOR SAME

BACKGROUND

1. Technical Field

The present disclosure relates to a laser machining device and an adjusting method for the laser machining device.

2. Description of Related Art

Microdots on a molding core for producing a light guide plate are usually machined by a laser machining device. Before a machining process starts, it is needed to correct a position of an original point of a coordinates of the laser machining device. When correcting, the laser machining device forms a number of microdots on a correction plate, compares actual positions of the microdots with predetermined positions of the microdots to find any deviation, and corrects the position of the original point accordingly. Yet, after the correcting process is applied, the correction plate is useless and wasted.

Therefore, it is desirable to provide a laser machining device and an adjusting method for the laser machining device which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
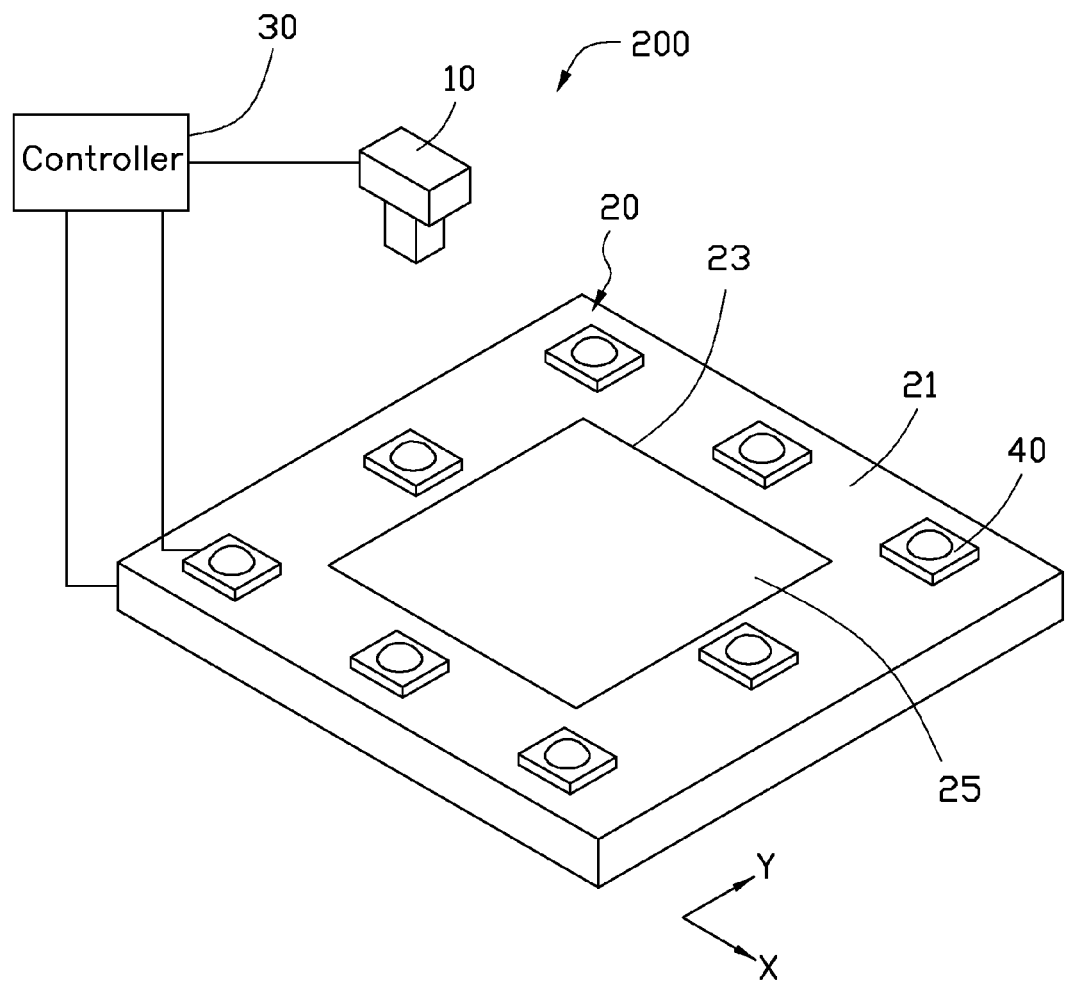
FIG. 1 is a schematic view of a laser machining device according to a first embodiment of the present disclosure.
Figure 2:
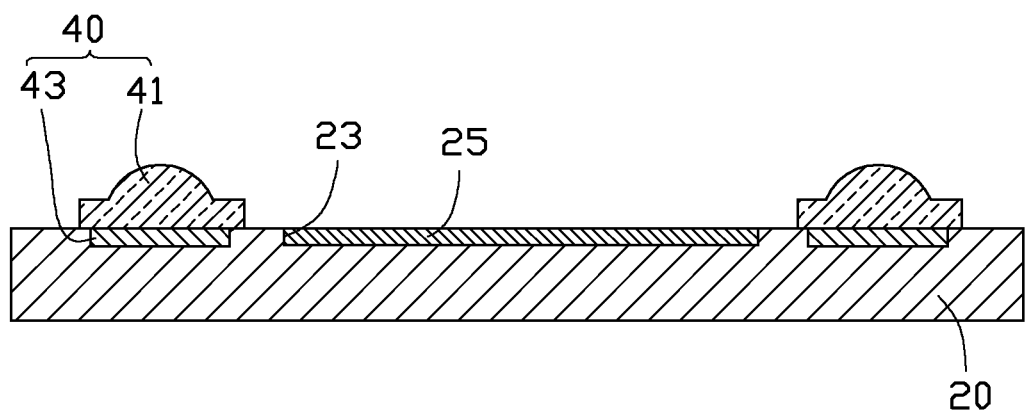
FIG. 2 is a sectional view of the laser machining device of FIG. 1.

FIGS. 1 and 2 show a laser machining device 200 according to a first embodiment. The laser machining device 200 includes a laser emitting device 10, a supporting device 20, a controller 30, and at least one optical detecting unit 40. In this embodiment, there are eight optical detecting units 40.

The supporting device 20 includes a supporting surface 21. The supporting surface 21 defines a supporting hole 23. In this embodiment, the supporting surface 21 and the supporting hole 23 are rectangular. The supporting hole 23 is positioned at the centre of the supporting surface 21. The supporting hole 23 is configured to receive a to-be-machined molding core 25.

The laser emitting device 10 is positioned above the supporting device 20. The laser emitting device 10 is configured to emit a laser beam. The controller 30 is configured to control the laser emitting device 10 to move along a predetermined route, and to control the laser emitting device 10 to emit the laser beam at predetermined positions, thus to machine microdots on the molding core 25.

The laser machining device 200 defines X-Y coordinates. The X coordinate and the Y coordinate are perpendicular to each other and are parallel to the supporting surface 21. The optical detecting units 40 are mounted on the supporting surface 21 and surround the supporting hole 23.

Each of the optical detecting units 40 includes a lens 41 and an optical sensor 43 covered by the lens 41. The lens 41 is a collimating lens. In this embodiment, the lens 41 is a convex lens. The lens 41 protects the optical sensor 43, and focuses light to the optical sensor 43. The optical sensor 43 is configured to detect luminous flux of received light, and send detected value to the controller 30.

Figure 3:
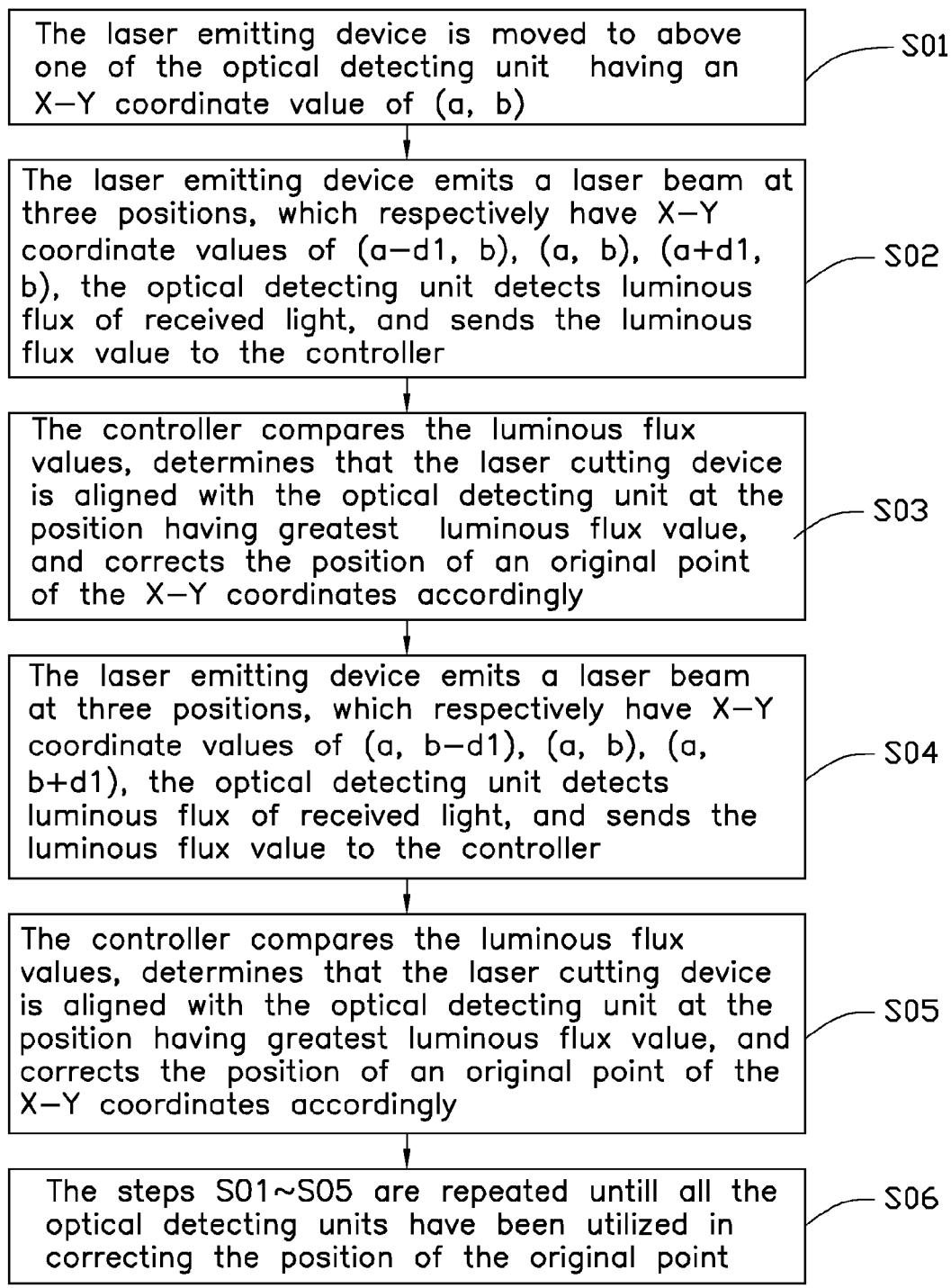
FIG. 3 is a flow chart of an adjusting method for a laser machining device according to a second embodiment.

Referring to FIG. 3, an adjusting method for the laser machining device 200 is disclosed, according to a second embodiment. The method includes the following steps.

In step S01, the laser emitting device 10 is moved to substantially above one of the optical detecting units 40. An X-Y coordinate value of the optical detecting unit 40 is (a, b).

In step S02, the laser emitting device 10 emits a laser beam at three positions, which respectively have X-Y coordinate values of (a−d1, b), (a, b), (a+d1, b), wherein d1 represents a predetermined distance, in this embodiment, d1 is equal to 5 micrometers. The laser beam is substantially perpendicular to the supporting surface 21. At each position, the optical detecting unit 40 detects luminous flux of received light, and sends the detected value to the controller 30.

In step S03, the controller 30 compares the detected values, and determines that the laser emitting device 10 is aligned with the optical detecting unit 40 at the position having the greatest detected value, and corrects the position of an original point of the X-Y coordinates accordingly. In detail, if the laser emitting device 10 is aligned with the optical detecting unit 40 at the position of (a−d1, b), the original point is moved towards the negative direction of the X coordinate by a distance equal to d1; if the laser emitting device 10 is aligned with the optical detecting unit 40 at the position of (a, b), the original point remains unchanged; if the laser emitting device 10 is aligned with the optical detecting unit 40 at the position of (a+d1, b), the original point is moved towards the positive direction of the X coordinate by a distance equal to d1.

In step S04, the laser emitting device 10 emits a laser beam at three positions, which respectively have X-Y coordinate values of (a, b−d1), (a, b), (a, b+d1). The laser beam is substantially perpendicular to the supporting surface 21. At each position, the optical detecting unit 40 detects luminous flux of received light, and sends the detected value to the controller 30.

In step S05, the controller 30 compares the detected values, and determines that the laser emitting device 10 is aligned with the optical detecting unit 40 at the position having the greatest detected value, and corrects the position of the original point of the X-Y coordinates accordingly. In detail, if the laser emitting device 10 is aligned with the optical detecting unit 40 at the position of (a, b−d1), the original point moves towards the negative direction of the Y coordinate by a distance equal to d1; if the laser emitting device 10 is aligned with the optical detecting unit 40 at the position of (a, b), the original point remains; if the laser emitting device 10 is aligned with the optical detecting unit 40 at the position of (a, b+d1), the original point moves towards the positive direction of the Y coordinate by a distance equal to d1.

In step S06, the steps S01~S05 are repeated until all the optical detecting units 40 have been utilized in correcting the position of the original point. In this way, the adjusting method is completed.

The laser machining device 200 includes the optical detecting units 40 for adjusting the position of the original point. Thus, a correction plate is not wasted and the adjusting speed is increased.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A laser machining device comprising:
   a laser emitting device;
   a supporting device comprising a supporting surface;
   a controller; and
   a optical detecting unit mounted on the supporting surface;
   wherein
   the laser machining device sets X-Y coordinates comprising an original point, the laser emitting device is configured to emit a laser beam at a plurality of positions, the optical detecting unit is configured to detect luminous flux of the laser beam and send detected values to the controller, the controller is configured to compare the luminous flux values to determine a greatest detected value, determine that the laser emitting device is aligned with the optical detecting unit at the position corresponding to the greatest detected value, and correct the position of the original point to accord with the position corresponding to the greatest detected value.

2. The laser machining device of claim 1, wherein the supporting surface defines a supporting hole configured to receive a molding core.

3. The laser machining device of claim 2, wherein the supporting surface and the supporting hole are rectangular.

4. The laser machining device of claim 1, wherein the optical detecting unit comprises a lens and an optical sensor covered by the lens.

5. The laser machining device of claim 4, wherein the lens is a collimating lens.

6. An adjusting method for a laser machining device, comprising:
   providing the laser machining device, the laser machining device comprising a laser emitting device, a support device comprising a support surface, a controller, and an optical detecting unit mounted on the support surface, the laser machining device setting X-Y coordinates comprising an original point, a coordinate value of the optical detecting unit being (a, b);
   moving the laser emitting device to substantially above the optical detecting unit;
   emitting a laser beam by the laser emitting device at three first positions having coordinate values of (a−d1, b), (a, b), (a+d1, b);
   obtaining three first luminous flux values corresponding to the three first positions by the optical detecting unit;
   sending the three first luminous flux values to the controller by the optical detecting unit, wherein d1 is a predetermined interval;
   comparing the three first luminous flux values to obtain a greatest first luminous flux value and determining that the laser emitting device is aligned with the optical detecting unit at one of the first positions corresponding to the greatest first luminous flux value;
   correcting the position of the original point at the X coordinate to accord with the one of the first positions corresponding to the greatest first luminous flux value;
   emitting a laser beam by the laser emitting device at three second positions having coordinate values of (a, b−d1), (a, b), (a, b+d1);
   obtaining three second luminous flux values corresponding to the three second positions by the optical detecting unit;
   sending the three second luminous flux values to the controller by the optical detecting unit; and
   comparing the three second luminous flux values to obtain a greatest second luminous flux value and determining that the laser emitting device is aligned with the optical detecting unit at one of the second positions corresponding to the greatest second luminous flux value; and
   correcting the position of the original point at the Y coordinate to accord with the one of the second positions corresponding to the greatest second luminous flux value.

7. The adjusting method of claim 6, wherein if the laser emitting device is aligned with the optical detecting unit at the first position having coordinate value of (a−d1, b), the original point moves towards the negative direction of the X coordinate by a distance equal to d1; if the laser emitting device is aligned with the optical detecting unit at the first position having coordinate value of (a, b), the original point remains unchanged; and if the laser emitting device is aligned with the optical detecting unit at the first position having coordinate value of (a+d1, b), the original point moves towards the positive direction of the X coordinate by a distance equal to d1.

8. The adjusting method of claim 6, wherein if the laser emitting device is aligned with the optical detecting unit at the second position having coordinate value of (a, b−d1), the original point moves towards the negative direction of the Y coordinate by a distance equal to d1; if the laser emitting device is aligned with the optical detecting unit at the second position having coordinate value of (a, b), the original point remains unchanged; and if the laser emitting device is aligned with the optical detecting unit at the second position having coordinate value of (a, b+d1), the original point moves towards the positive direction of the Y coordinate by a distance equal to d1.

9. The adjusting method of claim 6, wherein the supporting surface defines a supporting hole configured to receive a molding core.

10. The adjusting method of claim 9, wherein the supporting surface and the supporting hole are rectangular shaped.

11. The adjusting method of claim 6, wherein the optical detecting unit comprises a lens and an optical sensor covered by the lens.

12. The adjusting method of claim 11, wherein the lens is a collimating lens.

* * * * *